United States Patent [19]
Poynor et al.

[11] 3,723,086
[45] Mar. 27, 1973

[54] PROCESS FOR PRODUCING AMMONIUM PHOSPHATES AND POLYPHOSPHATES

[76] Inventors: Paul C. Poynor, 2512 Woodthrush Road; William H. Kegler, Osage Oak Mobile Homes-E-E of City, both of Ponca City, Okla. 74601

[22] Filed: May 20, 1971

[21] Appl. No.: 148,259

[52] U.S. Cl. ..........................71/29, 71/34, 423/310, 423/313, 423/315
[51] Int. Cl. ...............................................C05b 7/00
[58] Field of Search.......................71/29, 34–36, 43; 423/310, 313, 315

[56] References Cited

UNITED STATES PATENTS 3,540,874  11/1970  Stimson...................................71/29
3,578,433  5/1971  Bottai et al..............................71/29

Primary Examiner—Reuben Friedman
Assistant Examiner—Richard Barnes
Attorney—Joseph C. Kotarski, Henry H. Huth, Robert B. Coleman, Jr. and Ronnie D. Wilson

[57] ABSTRACT

An improved process for producing ammonium phosphates and polyphosphates in a pipe reactor. The improvement comprises the addition of urea to a stream of merchant grade wet process phosphoric acid prior to commingling the acid stream with a stream of ammonia within a confined zone to reduce the formation of insoluble ammonium phosphate materials which tend to block the fluid flow in the confined zone.

4 Claims, No Drawings

3,723,086

PROCESS FOR PRODUCING AMMONIUM PHOSPHATES AND POLYPHOSPHATES

This invention relates to an improved process for the production of ammonium phosphates and polyphosphates in a confined zone. More particularly the present invention relates to an improved process for producing ammonium phosphates and polyphosphates which utilize urea dissolved in an acid stream prior to the ammoniation thereof with ammonia to reduce the formation of insoluble ammonium phosphate materials in a confined reaction zone.

It is widely known by those skilled in the art that ammonium phosphates and polyphosphates may be produced by neutralizing wet process phosphoric acid with ammonia. Further, it is not known to use urea in the production of ammonium phosphates and polyphosphate materials. Urea has been added in such processes to increase nitrogen content of the fertilizer produced, to complex impurities present, to yield sprayable liquid fertilizers and as a condensing agent to condense phosphates in such a manner that the resultant polyphosphates are short chain and water soluble for use in liquid fertilizers.

Robert C. Miller in U.S. Pat. No. 3,022,153 discloses a method for preparing sprayable liquid fertilizer compositions from wet-process phosphoric acid using urea as a complexing agent to keep any impurities of iron and aluminum in a sprayable solution. Miller discloses the addition of wet process phosphoric acid to a solution of urea dissolved in water. Miller, subsequently, begins mixing his acid-urea-water solution in a mixer equipped with a blade, preferably having a blade tip linear speed of about 7,000 feet per minute. Miller injects aqueous ammonia into the vortex of the mixer while the stirring is continued until a prescribed pH range is achieved. Miller specifies that in order to obtain good results his reaction needs mechanical mixing, preferably turbine mixers. Miller does not mix in a confined zone and therefore does not encounter the problems of blocking associated therewith in the production of ammonium phosphates and polyphosphates therein.

John M. Stinson in U.S. Pat. No. 3,540,874 discloses the use of urea as a condensing agent in a process for the production of ammonium polyphosphates. Stinson mixes urea with phosphoric acid prior to ammoniating same in order to condense phosphates in such a manner that the resultant polyphosphates are predominantly of short chain length and are highly water soluble for use in liquid fertilizer production. However, Stinson, as well as Miller, does not mix his materials in a confined zone and does not encounter the problems of blocking associated therewith in the production of ammonium phosphates and polyphosphates therein. Stinson specifically excludes the use of an in-line mixing T in his process which would be equivalent to a confined zone as identified herein.

Other researchers in the field have found when preparing ammonium phosphates and polyphosphates in a reaction system having a confined reaction zone through the ammoniation of wet process phosphoric acid therein, that a buildup of insoluble material occurs on the walls of the reactor which causes a plug to form and eventually causes a shut down of the reactor system.

Therefore, it is an object of the present invention to provide the art with an improved process for the preparation of ammonium phosphates and polyphosphates in a pipe reactor.

Another object of the present invention is to provide the art with an improved process for making ammonium phosphates and polyphosphates utilizing urea dissolved in a phosphoric acid stream prior to ammoniation thereof with ammonia to reduce the formation of insoluble ammonium phosphate compounds in a pipe reactor.

A further object is to provide the art with an improved process for the continuous production of ammonium phosphates and polyphosphates without having unnecessary delays for cleaning out blocked equipment.

These and other objects of the present invention will become apparent from a reading of the following description.

It has now been found that the objects of the present invention can be attained by employing, in a process for producing ammonium phosphates and polyphosphates by commingling a turbulent stream of liquid merchant grade wet process phosphoric acid with a stream of ammonia within a confined zone wherein insoluble ammonium phosphates tend to block the fluid flow in said confined zone, the addition of an effective amount of urea to said stream of wet process phosphoric acid prior to said commingling to reduce the formation of said insoluble ammonium phosphates.

In the operation of the improved process, to increase the on-stream operational time of a direct conversion ammonium phosphate process, the merchant grade phosphoric acid is treated with urea before using the acid in a reactor system. Urea is dissolved in the acid, and the solution is then fed to the reactor for ammoniation.

The improved process described herein allows the use of merchant grade wet process phosphoric acid having a $P_2O_5$ content of from about 45 percent to about 61 percent which is an inexpensive phosphoric acid. The use of merchant grade acid in preparing ammonium phosphates and polyphosphates reduces the overall cost of manufacturing same significantly. Probably the most inexpensive form of merchant grade acid contains about 52–54% $P_2O_5$ content, and from an economic standpoint it is therefore the most preferred in the described process.

To be effective in inhibiting the formation of the insoluble materials in the confined zone of the reactor systems in which the described process is most useful, from about 2 to about 10 percent by weight of urea should be dissolved in the acid prior to passing same into the confined zone for ammoniation purposes. Below 2 percent by weight of urea in the acid, the formation of insoluble materials is less inhibited and shut downs of the system for cleaning would occur significantly more frequently than when more than 2 percent is used. Amounts of more than 10 percent by weight of urea dissolved in the acid cause problems in foaming and thickening of the resultant product. Furthermore, from a practical and economic standpoint the use of more than 10 percent by weight of urea in the acid contributes significantly to the overall expense of the process. The preferred range of urea in the acid from both an economic and practical standpoint as toward achieving the most desirable product is from about 3 percent to about 5 percent by weight of urea. The optimum effective amount of urea to be utilized in the present process is dependent on the grade of acid ($P_2O_5$ content), the cost thereof, the cost of the urea, length of the time period desired between shut downs for cleaning the equipment, and the view taken toward optimizing the efficiency of the entire process and the end use of the product produced thereby.

The term pipe reactor as used herein relates to various reactor systems in the industry described therein by such terms as pipe reactor, in-line mixing T, jet reactor and particularly the apparatus defined in applicants' copending application Ser. No. 21,907, filed Mar. 23, 1970. These various reactors named are merely illustrative of the type in which the present process is useful in and are not presented to limit said term to any specific dimensions thereof.

The following comparative examples are shown to illustrate the effective operation of the improved process described herein. A comparison between the use of urea in a confined reaction zone for the production of ammonium polyphosphates and the same process under similar conditions and with similar materials without urea is shown.

Example 1

A. Preparation of the acid feed

Five pounds of urea ($\approx$45%N) were mixed with 95 pounds of merchant grade wet process phosphoric acid ($\approx$56% $P_2O_5$) in 800-pound batches. This solution was then stirred for about two hours to insure that the urea was dissolved in the acid. All dissolution and mixing was carried out at ambient temperatures.

B. Operation of the process with Urea

Feed acid containing 5 percent by weight of urea was heated to 200°F. and passed at the rate of about 100 lbs/hr to a pipe reactor one-half inch in diameter and 32 inches in length where it was ammoniated with about 13.4 lbs/hr of gaseous ammonia preheated to 200°F. The resultant ammonium phosphate product had an analysis of about 11.5% nitrogen and 57.6% $P_2O_5$. The reactor system was operated for 24 hours and then shut down and inspected. Inspection showed that only trace amounts of insoluble ammonium phosphate compounds had formed along the walls of the reactor.

C. Operation of the process without Urea

Ammoniation of wet process acid which had not been treated with urea was conducted in a pipe reactor similar in geometry to the one described above and also at the same operating conditions. This reactor was plugged solid with an insoluble ammonium phosphate compound along the walls of the reactor at the end of nine hours operational time.

We claim:

1. In the process of producing ammonium phosphates and polyphosphates by commingling a turbulent stream of liquid merchant grade wet process phosphoric acid with a stream of ammonia within a pipe reactor wherein insoluble ammonium phosphates tend to block the fluid flow in said pipe reactor, the improvement comprising adding an effective amount of urea to said stream of wet process phosphoric acid prior to said commingling to reduce the formation of said insoluble ammonium phosphates.

2. The improvement of claim 1 wherein said effective amount of urea in said acid stream is at least 2 percent by weight of urea.

3. The improvement of claim 1 wherein said effective amount of urea in said acid stream is in the range of from about 2 percent to about 10 percent by weight of urea.

4. The improvement of claim 1 wherein said effective amount of urea in said acid stream is in the range of from about 3 percent to about 5 percent by weight of urea.

* * * * *